United States Patent [19]

van der Schaaf

[11] Patent Number: 4,840,678

[45] Date of Patent: Jun. 20, 1989

[54] PIPE COIL COOKER

[75] Inventor: Herman J. van der Schaaf, Wilnis, Netherlands

[73] Assignee: B. V. Gerbs. ter Braak, Netherlands

[21] Appl. No.: 715,639

[22] Filed: Mar. 25, 1985

[30] Foreign Application Priority Data

Mar. 26, 1984 [NL] Netherlands ........................ 8400950

[51] Int. Cl.[4] ........................... B01J 3/00; C13F 1/00; B01D 1/00

[52] U.S. Cl. ........................................ 127/2; 127/9; 127/16; 159/23; 159/25.4; 165/110; 165/163

[58] Field of Search .................. 127/2, 16, 9; 159/23, 159/28 C; 165/110, 163

[56] References Cited

U.S. PATENT DOCUMENTS

| | | | |
|---|---|---|---|
| 859,352 | 7/1907 | Unglaub | 159/23 |
| 956,508 | 5/1910 | Baker | 159/23 |
| 957,113 | 5/1910 | Shaw | 127/16 |
| 1,150,713 | 8/1915 | Soderlund | 159/23 |
| 1,473,122 | 11/1923 | Patten | 159/23 |
| 2,146,141 | 2/1939 | Harns | 165/163 |
| 3,533,467 | 10/1970 | Rummel | 165/163 |

OTHER PUBLICATIONS

*Cane Sugar Handbook*, 10th Ed., John Wiley & Sons, Meade-Chen, 1977, pp. 204-205.

*Primary Examiner*—H. M. S. Sneed
*Assistant Examiner*—Chung K. Pak
*Attorney, Agent, or Firm*—John P. Snyder

[57] ABSTRACT

A sugar-cooking apparatus of the type having a standing pipe coil surrounded by a heating jacket. The coiled pipe is of flattened cross-section for improved heat transfer. During use, a mixture of sugar, water and additives is passed through the coiled pipe and rapidly heated therein to form a sugar solution.

8 Claims, 2 Drawing Sheets

PIPE COIL COOKER

The invention relates to an apparatus for cooking sugar i.e. for preparing a sugar solution from a mixture of sugar, water and additives.

For this purpose apparatuses are known which mainly comprise a tube wound to form a standing pipe coil surrounded by a vessel serving as a heating jacket. Such an apparatus, also termed pipe coil cooker, is described in the German magazine "Kakao+Zucker", 1979, No. 6, 132 to 136, in particular FIG. 5 on page 135. During use a mixture of sugar, water and glucose or other additives is pumped in upward direction through the pipe coil, whilst vapour or a heating medium is passed in countercurrent through the heating vessel. The result is that the mixture passed through the tube is rapidly raised to a higher temperature at which the sugar crystals dissolve and a crystal-clear mass is obtained. In dependence on the working pressure used, temperatures of 100° to 140° C. can be attained. The resultant sugar solution is then fed to a vapour separator where the water vapour developed is removed so that an inspissated sugar mass is formed, which can be converted into bonbons or other confectionery.

In the known apparatus of the kind set forth the coiled tube has a circular cross-section, which has so far been satisfying.

However, further research has shown that appreciable advantages can be obtained by using a coiled tube having a flattened cross-section and more particularly a rectangular cross-section with rounded-off corners. As compared with a tube of circular cross-section having the same sectional area the heating surface is then considerably larger, which means that the heat transfer per unit of weight of passing mixture is improved. Therefore, with the same sectional area a shorter pipe coil will be sufficient or a smaller sectional area may be used.

The invention provides an apparatus for cooking sugar comprising a tube wound to form a standing pipe coil suitable for passing a mixture of sugar, water and additives and surrounded by a heating jacket, said apparatus being characterized by the fact that the coiled tube is of flattened cross-section and preferably of rectangular cross-section with rounded-off corners.

Further features will become apparent from the following description.

The invention is illustrated in the drawing which shows a few embodiments by way of example.

Figures 1, 2:
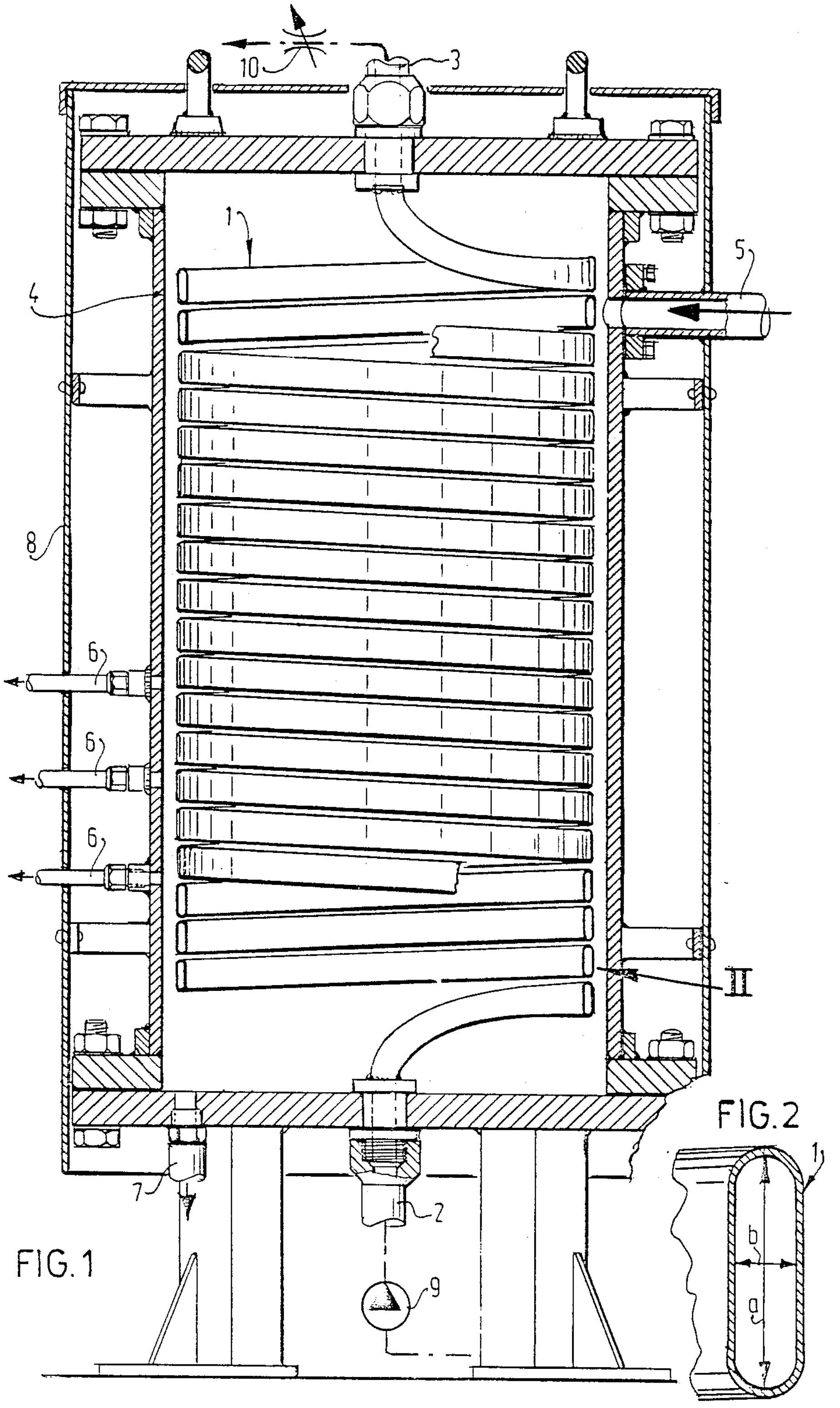
FIG. 1 shows a first embodiment of the sugar cooker embodying the invention in a vertical cross-sectional view.
FIG. 2 is an enlarged sectional view of a detail (designated by II in FIG. 1).

The apparatus shown in FIG. 1 comprises a tube 1 wound to form a standing pipe coil having a low inlet end 2 and a high outlet end 3. With the exception of the ends this pipe coil 1 is completely surrounded by a vapour vessel 4 serving as a heating jacket. The vessel 4 has a vapour inlet 5, vapour outlets 6 and a condensate outlet 7 and is covered by a protective cap 8. Near the inlet end 2 of the pipe coil 1 a pump 9 is arranged for passing the sugar mixture to be processed and near the outlet end 3 there is provided a pressure control 10 for regulating the operational pressure. These entities comprise means in communication with the inlet for forcing a mixture containing sugar, water and additives upwardly through the coil.

Characteristic of the invention is that the pipe coil 1 has a flattened cross-section and in particular a rounded-off rectangular cross-section as shown in FIG. 2. Distinguishing a long axis a and a short axis b in this cross-section, it is common practice to arrange the long axis a in a vertical position, which is most favourable in this manufacturing technique. The length ratio between b and a may vary within wide limits, but preferable it is between 1:2 and 1:12. As compared with a circular section of the same circumferential length, thus a smaller sectional area is obtained, whereas as compared with a circular section of the same sectional area a larger circumferential length and hence a larger heating surface are obtained.

During operation a liquid mixture of sugar, water and additives, prepared, for example, in a mixing vessel (not shown) is fed at the inlet end 2 of the pipe coil 1 and with the aid of the pump 9 it is passed in upward direction through the pipe coil. In the rising material pressure is built up, which can be amplified with the aid of the pressure control 10 near the outlet end. At the same time pressurized vapour is admitted through the inlet 5 into the vapour vessel 4 and passed in downward direction through the vessel 4 so that the pipe coil 1 is surrounded on all sides by vapour and is subjected to a strong external heating. By the external heating the mixture flowing through the pipe coil is heated to a relatively high temperature, at which the sugar crystals dissolve. This temperature may vary from about 104° C. at atmospheric pressure to about 140° C. at a higher pressure. The rounded-off rectangular (flattened) cross-section of the pipe coil 1 ensures an optimum heat transfer.

The material leaving the apparatus through the outlet end 3 and the control-cock 10 is a crystal-clear sugar solution which can be subsequently freed of the water vapour having developed in a vapour separator. The result is concentrated sugar mass that can be readily converted into various kinds of confectionery.

Figure 3:
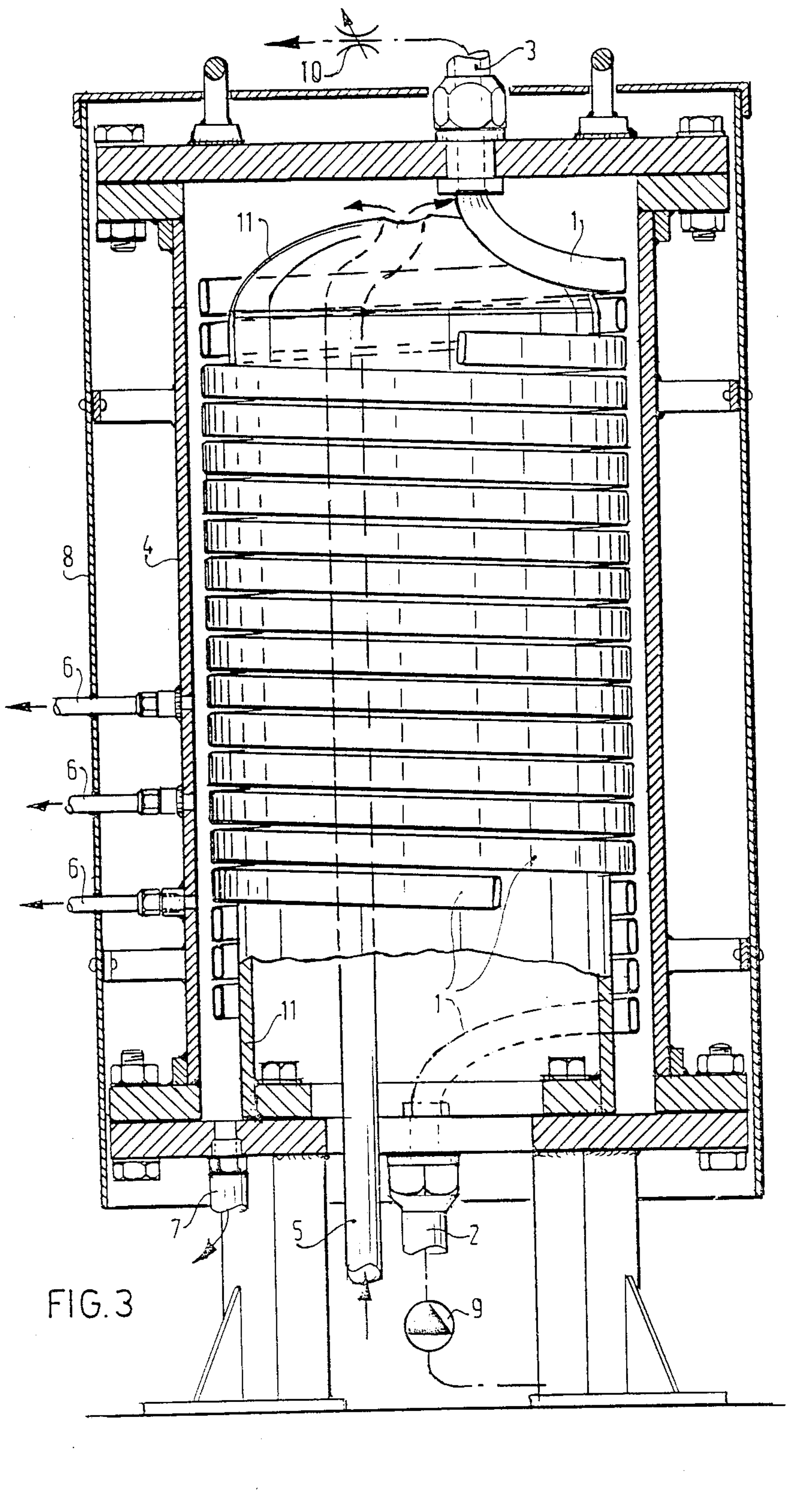
FIG. 3 shows a second embodiment of the pipe coil cooker embodying the invention in a vertical sectional view.

The embodiment of FIG. 3 largely corresponds with that of FIG. 1. A difference is that the vessel 4 has an inner wall 11 so that a double-walled heating jacket 4, 11 is formed, which only surrounds the turns of the pipe coil. The advantage thereof is that the space inside the wall 11 need no longer be filled with vapour. For spatial reasons the vapour inlet 5 is disposed at a different place. The mode of operation of this embodiment is equal to that of FIG. 1.

In both embodiments the pipe coil 1 may be made from any suitable material having satisfactory thermal conductivity appropriate mechanical properties. In particular copper and stainless steel are suitable for the pipe coil.

It will be obvious that within the scope of the invention several variants of the embodiments shown can be conceived. For example, the heating medium in the vessel 4 need not necessarily be vapour; if desired oil or another medium may be employed.

The apparatus embodying the invention can be used for processing various kinds of basic mixtures. For example, a conventional mixture of sugar, water and glucose (or invert sugar) may be processed, but as well a similar mixture to which milk or milk fats are added.

Therefore, a great variety of final products can thus be obtained.

What I claim is:

1. Apparatus for cooking sugar comprising a tubular coil wound about a longitudinal axis which is substantially vertically disposed, said coil including an inlet at the lower portion thereof and an outlet at the upper portion thereof, means in communication with said inlet for forcing a mixture of sugar, water and additives upwardly through said coil, a heating jacket disposed in surrounding relationship to said coil, means in communication with said heating jacket for providing a heating medium within said jacket to heat the mixture passing through said coil to a high temperature at which sugar crystals dissolve so as to provide a clear sugar solution at said outlet, and means in communication with said outlet for controlling the operational pressure within said coil, said coil being of rounded-off rectangular cross-section to ensure optimum heat transfer by improving the heat transfer per unit weight of the mixture of sugar, water and additives forced through the coil.

2. Apparatus as defined in claim 1 wherein the cross-section of the tubing defining said coil includes a long axis and a short axis, said long axis also being substantially vertically disposed.

3. Apparatus as defined in claim 2 wherein the ratio between the long and the short axis lies between 1:2 and 1:12.

4. Apparatus as defined in claim 1 wherein the cross-section of the tubing defining said coil includes a long axis and a short axis, the ratio between the long and the short axis of the coil section lying between 1:2 and 1:12.

5. Apparatus as defined in claim 1 wherein said means for forcing the mixture through the coil comprises a pump, said pump being located near said inlet.

6. Apparatus as defined in claim 1 wherein said means for controlling the operational pressure within said coil comprises a variably controlled valve located near said outlet.

7. Apparatus as defined in claim 1 wherein said coil is entirely enclosed within said heating jacket.

8. Apparatus as defined in claim 1 wherein said heating jacket is double-walled including an inner and an outer wall, said coil being disposed between said inner and outer walls and being enclosed therebetween.

* * * * *